Feb. 19, 1952
B. HAYDEN
2,586,162
WEED GUARD FOR FISHHOOKS
Filed May 19, 1950
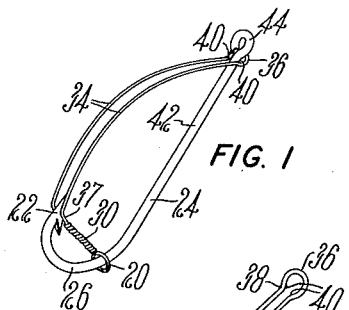
FIG. 1
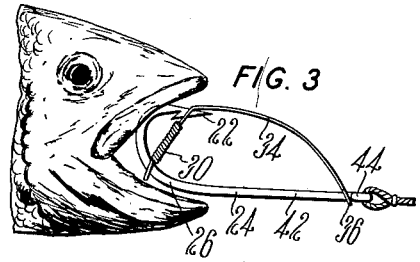
FIG. 3
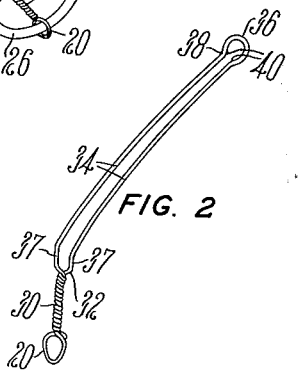
FIG. 2
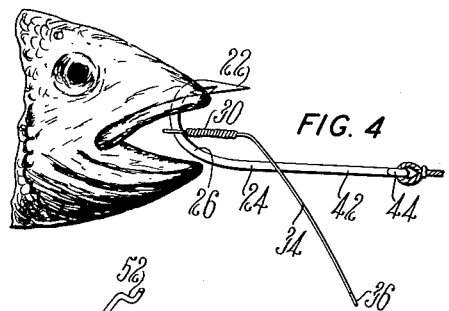
FIG. 4
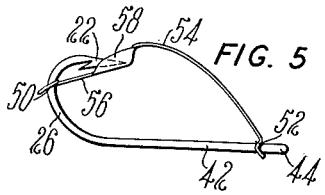
FIG. 5
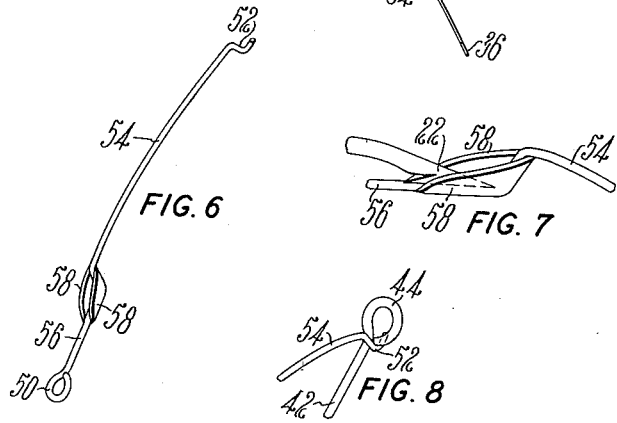
FIG. 6
FIG. 7
FIG. 8
INVENTOR
BOYD HAYDEN
by Wright, Browns,
Quinby & May
ATT'YS Patented Feb. 19, 1952

2,586,162

UNITED STATES PATENT OFFICE 2,586,162

WEED GUARD FOR FISHHOOKS

Boyd Hayden, Newton, Mass.

Application May 19, 1950, Serial No. 163,021

5 Claims. (Cl. 43—43.2)

This invention relates to a guard for use on fish hooks when trolling through waters which have weeds or grass therein. An unprotected hook in such waters soon gathers a bundle of weeds which trail along behind it and effectively repel the fish which might otherwise strike at the lure to which the hook is attached. Guards of various kinds have been contrived to deflect weeds from the hook. These guards are usually attached to the hook near its eye, the free end of the guard being at or near the point of the hook. It is an object of the present invention to provide an improved and more effective guard by arranging for it to be loosely attached to the hook at the curved portion thereof, the free end of the guard being adapted to catch on the hook at or near the eye thereof and to be readily dislodged by moderate pressure on the tensed mid portion of the guard which is bowed or sprung outward and serves to hold the free end of the guard against the shank of the hook.

According to the present invention, the improved guard preferably includes three features, namely, an eye at one end which engages loosely on the curved portion of the hook and also permits ready removal of the guard from the hook, a shoulder near its free end to bear against the shank of the hook at or near the eye thereof, and an intermediate portion which is sprung outward when the shoulder is moved into engagement with the shank of the hook. This intermediate portion is also shaped so that part of it bears against the barbed end portion of the hook. Thus, weeds or grass through which the hook is pulled are deflected outward beyond the point of the hook by the bowed mid portion of the guard and are not caught in the open loop between the point and shank of the hook as they would be if the hook had no guard.

For a more complete understanding of the invention, reference may be had to the following description thereof and to the drawing of which:

Figure 1 is a perspective view of a fish hook equipped with a guard embodying the invention;

Figure 2 is a perspective view of the guard itself apart from the hook;

Figure 3 is an elevational view of a hook with a guard about to be struck by a fish;

Figure 4 is an elevational view of the same showing the position of the guard after the fish has struck;

Figure 5 is an elevational view of a hook with a modified form of guard thereon;

Figure 6 is an elevational view of the guard shown in Figure 5;

Figure 7 is a fragmentary perspective view of the point end of the hook and the adjacent portion of the guard shown in Figure 5;

Figure 8 is a fragmentary perspective view of the eye end portion of the hook and the adjacent end portion of the guard such as is shown in Figure 5.

The form of the invention illustrated in Figures 1-4 consists of a guard which may conveniently be made of a single piece of spring wire. The wire is shaped to form an eye 20 at one end of the guard, this eye being adapted to slip over the pointed end 22 of a fish hook 24 of customary shape so as to fit loosely on the curved portion 26 of the hook. Adjacent to the eye 20 the wire is preferably twisted to form a comparatively stiff portion 30 of the guard extending from the eye 20 across the open loop of the hook to the pointed end portion 22. At this point, the guard bifurcates as at 32 and the remainder of the guard is in the form of an elongated narrow loop defined by two spaced wires 34 running side by side and joining at the end 36 of the guard remote from the eye 20. At the bifurcation 32 the wires 34 extend outward as at 37 a sufficient distance to flank the end portion 22 and to protect the point. Then they curve upward toward the eye of the hook. At or near the end 36 of the guard it abuts the fish hook at or near the eye thereof. As shown, the wires 34 are shaped to form a slight constriction 38 in the elongated loop with resultant inner shoulders 40 which abut the hook in this form of the invention. The constriction 38 is narrower than the diameter of the shank 42 of the fish hook 24. Hence, when the guard is mounted on the fish hook as illustrated in Figure 1, the shoulders 40 bear against the shank of the fish hook adjacent to the eye 44 of the hook and are pressed against the shank by spring tension in the spaced wires 34, these wires being the intermediate portion of the guard. As is evident from Figures 1-4, the wires 34 are sprung or bowed outward when the guard is mounted in place. The tension on this portion of the guard also serves to press the bifurcation 32 against the inner edge of the pointed end portion 22 of the fish hook. The wires project outward beyond the point so as to protect the same from weeds or grass through which the hook may be drawn when in use. When a fish strikes, it presses the mid portion 34 inward, this pressure being sufficient to spread the shoulders 40 and permit them to move beyond the shank of the fish hook. When the shank has thus passed the constriction 38, the guard assumes the position shown in Figure 4, and no longer shields the pointed end of the hook. The guard can readily be removed from the hook or replaced thereon as the eye 20 is preferably made large enough to slip over the barbed end 22.

Figures 5–8 illustrate a slightly modified form of the invention, this form also consisting of a guard which is made of an elongated piece of spring metal, either a stamping from sheet metal or a drawn wire. This guard has an eye 50 at one end adapted to be mounted over the barbed end 22 of the fish hook and to fit loosely on the curved portion 26 thereof. The free end portion of the guard abuts the fish hook. For example, the end portion of the wire is bent to form a shoulder 52 adapted to catch against the shank 42 of the hook at the eye 44 thereof, the shoulder 52 being held against the eye and shank by spring tension in the intermediate portion 54 of the guard which is sprung or bowed outward as indicated in Figure 5. Between the bowed portion 54 and a comparatively straight portion 56 which extends from the eye 50, a pair of flaps 58 are formed or mounted on the straight portion 56 to flank the pointed portion 22 of the fish hook. The flaps 58 are also secured to or merge with an outwardly bent portion of the wire which extends out beyond the point of the hook to cooperate with the flaps 58 in protecting the point of the hook from being fouled by weeds. When a fish strikes, the pressure of the jaw on the bowed portion 54 quickly dislodges the shoulder 52 from its engagement against the shank and eye of the fish hook so that the guard falls away from the pointed end 22 and the point becomes effective to impale the fish.

I claim:

1. In combination with a fish hook having an eye, a shank with a curved portion and a barbed pointed end portion, a weed guard comprising an elongated resilient member having an eye at one end loosely surrounding the shank of the hook at a point of the curved portion thereof and at the other end abutting said fish hook at a point adjacent to the eye thereof, said guard also having an intermediate portion extending between the point and eye of the hook bowed outward under tension, and a guard portion flanking the barbed point portion of the hook.

2. In combination with a fish hook having an eye, a shank with a curved portion and a barbed pointed end portion, a weed guard comprising an elongated resilient member having an eye at one end loosely surrounding the shank of the hook at a point of the curved portion thereof and a shoulder at the other end engaging said shank at the eye of the hook, said guard also having an intermediate portion extending between the point and the eye of the hook and bowed outward to press said shoulder against said shank, and a guard portion flanking the barbed point portion of the hook.

3. In combination with a fish hook having an eye, a shank with a curved portion, and a barbed pointed end portion, a weed guard comprising an elongated member having an eye at one end loosely surrounding the shank of the hook at a point of the curved portion thereof, a portion extending from said eye to the barbed end portion of the hook and a tensed outwardly bowed portion extending between the point and the eye of the hook, the end of said member remote from said eye being dislodgably pressed by tension of the member against the fish hook at the eye end thereof.

4. A weed guard for a fish hook comprising an elongated member having an eye at one end thereof adapted to fit loosely on the shank of a fish hook, said member having a comparatively rigid portion extending from said eye and bifurcating into two uniformly spaced resilient elements joined at the remote end of the member to form a closed loop, said elements being shaped near said remote end to form a constriction narrower than the spacing between the elements.

5. A fish hook having an eye, a shank, and a barbed pointed portion, and a resilient weed guard on said hook, said guard having an eye at one end loosely fitted on the shank of said hook, a shoulder at the other end dislodgably engaging said shank at the eye end of the hook, and an intermediate portion bowed under tension and bearing against the barbed point portion of the hook.

BOYD HAYDEN.

REFERENCES CITED

The following references are of record in the file of this patent:

UNITED STATES PATENTS

| Number | Name | Date |
|---|---|---|
| 859,045 | Burke | July 2, 1907 |
| 2,090,571 | Coffin | Aug. 17, 1937 |
| 2,160,347 | Walsh | May 30, 1939 |
| 2,195,347 | Wiard | Mar. 26, 1940 |
| 2,506,883 | Mattieson | May 9, 1950 |